United States Patent
Golden et al.

(10) Patent No.: US 7,401,032 B1
(45) Date of Patent: *Jul. 15, 2008

(54) PROCESS FOR THE DISTRIBUTION AND REDEMPTION OF COUPONS

(75) Inventors: Steven M. Golden, Bloomfield Hills, MI (US); Hillel Levin, River Forest, IL (US); Gary D. Gentry, Brighton, MI (US); James A. Barbour, Dearborn, MI (US); Albert Schornberg, Holly, MI (US); Bradley A. Anderson, Hazel Park, MI (US)

(73) Assignee: News America Marketing Properties, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/490,362

(22) Filed: Jan. 24, 2000

Related U.S. Application Data

(63) Continuation of application No. 09/073,334, filed on May 6, 1998, now abandoned, which is a continuation of application No. 08/507,693, filed on Jul. 25, 1995, now Pat. No. 5,761,648.

(51) Int. Cl.
*G06Q 30/00* (2006.01)

(52) U.S. Cl. .............................. 705/14; 705/1; 705/10; 705/26; 705/27

(58) Field of Classification Search .................... 705/1, 705/10, 14, 26, 27
See application file for complete search history.

(56) References Cited

U.S. PATENT DOCUMENTS

| | | |
|---|---|---|
| 3,465,289 A | 9/1969 | Klein |
| 3,505,646 A | 4/1970 | Affel |

(Continued)

FOREIGN PATENT DOCUMENTS

| | | |
|---|---|---|
| EP | 0 512 509 A2 | 5/1992 |

(Continued)

OTHER PUBLICATIONS

Sep. 19, 1999 Memorandum Re: Phase 1 Functional Requirements for Catalina Online.
Nikkei Multimedia for Business Sep. 1998 No. 38 (Japanese Publication—no translation available).
Nikkei Multimedia for Business Mar. 1998 No. 32 (Japanese Publication—no translation available).

(Continued)

*Primary Examiner*—Raquel Alvarez
(74) *Attorney, Agent, or Firm*—Thelen Reid Brown Raysman & Steiner LLP

(57) ABSTRACT

A data processing system issuing electronic certificates through "online" networks of personal computers, televisions, or other devices with video monitors or telephones. Each electronic certificate includes transaction data and identification data, and can be printed out on a printing device linked to a consumer's personal input device, or electronically stored in a designated data base until a specified expiration date. The certificate can be used for various purposes, including use as a coupon for a discounted price on a product or service, proof of a gift or award, proof of reservation, or proof of payment. Consumers access the data processing system online, browse among their choices, and make their selections. The data processing system provides reports on the selected certificates and their use following selection. Certificate issuers also have online access to the data processing system and can create or revise offers, and provide various instructions pertaining to the certificates, including limitations as to the number of certificates to be issued in total and to each individual consumer.

3 Claims, 8 Drawing Sheets

U.S. PATENT DOCUMENTS

| | | |
|---|---|---|
| 3,606,688 A | 9/1971 | Zawels et al. |
| 3,777,410 A | 12/1973 | Robinson |
| 3,889,062 A | 6/1975 | Epstein |
| 3,899,775 A | 8/1975 | Larsen |
| 3,959,624 A | 5/1976 | Kaslow |
| 4,004,354 A | 1/1977 | Yamauchi |
| 4,012,132 A | 3/1977 | Lazarus |
| 4,014,004 A | 3/1977 | Fuller |
| 4,044,380 A | 8/1977 | Justice et al. |
| 4,071,697 A | 1/1978 | Bushnell et al. |
| 4,071,740 A | 1/1978 | Gogulski |
| 4,141,078 A | 2/1979 | Bridges, Jr. et al. |
| 4,166,540 A | 9/1979 | Marshall |
| 4,186,438 A | 1/1980 | Benson et al. |
| 4,208,652 A | 6/1980 | Marshall |
| 4,245,468 A | 1/1981 | Fondacci |
| 4,247,759 A | 1/1981 | Yuris et al. |
| RE30,579 E | 4/1981 | Goldman et al. |
| RE30,580 E | 4/1981 | Goldman et al. |
| 4,264,924 A | 4/1981 | Freeman |
| 4,268,744 A | 5/1981 | McGeary |
| 4,271,351 A | 6/1981 | Bloodworth |
| 4,290,688 A | 9/1981 | Call |
| 4,331,973 A | 5/1982 | Eskin et al. |
| 4,331,974 A | 5/1982 | Cogswell et al. |
| 4,355,372 A | 10/1982 | Johnson et al. |
| 4,359,631 A | 11/1982 | Lockwood et al. |
| 4,373,133 A | 2/1983 | Clyne et al. |
| 4,396,985 A | 8/1983 | Ohara |
| 4,404,589 A | 9/1983 | Wright, Jr. |
| 4,412,631 A | 11/1983 | Haker |
| 4,449,186 A | 5/1984 | Kelly et al. |
| 4,451,701 A | 5/1984 | Bendig |
| 4,458,320 A | 7/1984 | Sutton |
| 4,484,302 A | 11/1984 | Cason et al. |
| 4,484,328 A | 11/1984 | Schlafly |
| 4,500,880 A | 2/1985 | Gomersall et al. |
| 4,546,382 A | 10/1985 | McKenna et al. |
| 4,554,446 A | 11/1985 | Murphy et al. |
| 4,567,359 A | 1/1986 | Lockwood |
| 4,573,072 A | 2/1986 | Freeman |
| RE32,115 E | 4/1986 | Lockwood et al. |
| 4,588,881 A | 5/1986 | Pejas et al. |
| 4,592,546 A | 6/1986 | Fascenda et al. |
| 4,593,904 A | 6/1986 | Graves |
| 4,597,046 A | 6/1986 | Musmanno et al. |
| 4,602,279 A | 7/1986 | Freeman |
| 4,603,232 A | 7/1986 | Kurland et al. |
| 4,608,601 A | 8/1986 | Schreck et al. |
| 4,625,275 A | 11/1986 | Smith |
| 4,626,844 A | 12/1986 | Mann et al. |
| 4,630,108 A | 12/1986 | Gomersall |
| 4,635,132 A | 1/1987 | Nakamura |
| 4,636,950 A | 1/1987 | Caswell et al. |
| 4,642,767 A | 2/1987 | Lerner |
| 4,658,290 A | 4/1987 | McKenna et al. |
| 4,669,730 A | 6/1987 | Small |
| 4,670,853 A | 6/1987 | Stepien |
| 4,672,377 A | 6/1987 | Murphy et al. ............. 340/5.41 |
| 4,673,802 A | 6/1987 | Ohmae et al. ................ 705/17 |
| 4,674,041 A * | 6/1987 | Lemon et al. ................ 705/14 |
| 4,699,532 A | 10/1987 | Smith |
| 4,703,423 A | 10/1987 | Bado et al. |
| 4,713,761 A | 12/1987 | Sharpe et al. |
| 4,733,301 A | 3/1988 | Wright, Jr. |
| 4,734,858 A | 3/1988 | Schlafly |
| 4,747,050 A | 5/1988 | Brachtl et al. ............... 705/708 |
| 4,748,684 A | 5/1988 | Wright, Jr. |
| 4,750,151 A | 6/1988 | Baus |
| 4,774,663 A | 9/1988 | Musmanno et al. |
| 4,775,935 A | 10/1988 | Yourick |
| 4,792,018 A | 12/1988 | Humble et al. |
| 4,794,530 A | 12/1988 | Yukiura et al. |
| 4,807,031 A | 2/1989 | Broughton et al. |
| 4,812,986 A | 3/1989 | Smith |
| 4,815,741 A | 3/1989 | Small |
| 4,816,904 A | 3/1989 | McKenna et al. |
| 4,821,101 A | 4/1989 | Short |
| 4,825,045 A | 4/1989 | Humble |
| 4,833,308 A | 5/1989 | Humble |
| 4,847,690 A | 7/1989 | Perkins |
| 4,853,882 A | 8/1989 | Marshall |
| 4,855,908 A | 8/1989 | Shimoda et al. ............... 705/20 |
| 4,858,000 A | 8/1989 | Lu |
| 4,862,350 A | 8/1989 | Orr et al. .................... 709/213 |
| 4,870,596 A | 9/1989 | Smith |
| 4,882,724 A | 11/1989 | Vela et al. |
| 4,890,321 A | 12/1989 | Seth-Smith et al. |
| 4,894,784 A | 1/1990 | Smith |
| 4,896,791 A | 1/1990 | Smith |
| 4,908,761 A | 3/1990 | Tai |
| 4,922,522 A | 5/1990 | Scanlon |
| 4,926,256 A | 5/1990 | Nanba |
| 4,929,819 A | 5/1990 | Collins, Jr. |
| 4,937,742 A | 6/1990 | Marshall |
| 4,937,853 A | 6/1990 | Brule et al. |
| 4,959,686 A | 9/1990 | Spallone et al. |
| 4,959,783 A | 9/1990 | Scott et al. |
| 4,965,437 A | 10/1990 | Nagai |
| 4,972,504 A | 11/1990 | Daniel, Jr. et al. |
| 4,973,952 A | 11/1990 | Malec et al. |
| 4,974,170 A | 11/1990 | Bouve et al. |
| 4,975,951 A | 12/1990 | Bennett |
| 4,982,337 A | 1/1991 | Burr et al. |
| 4,982,346 A | 1/1991 | Girouard et al. |
| 4,984,156 A | 1/1991 | Mekata |
| 4,996,705 A | 2/1991 | Entenmann et al. |
| 5,003,384 A | 3/1991 | Durden et al. |
| 5,003,472 A | 3/1991 | Perrill et al. |
| 5,010,485 A | 4/1991 | Bigari |
| 5,014,125 A | 5/1991 | Pocock et al. |
| 5,014,212 A | 5/1991 | Smith |
| 5,025,139 A | 6/1991 | Halliburton, Jr. |
| 5,025,372 A | 6/1991 | Burton et al. ................. 705/14 |
| 5,039,848 A | 8/1991 | Stoken |
| 5,047,614 A | 9/1991 | Bianco |
| 5,048,833 A | 9/1991 | Lamle |
| 5,056,019 A | 10/1991 | Schultz et al. |
| 5,063,610 A | 11/1991 | Alwadish |
| 5,069,453 A | 12/1991 | Koza et al. |
| 5,070,404 A | 12/1991 | Bullock et al. |
| 5,077,607 A | 12/1991 | Johnson et al. |
| RE33,808 E | 1/1992 | Wright, Jr. |
| 5,083,272 A | 1/1992 | Walker et al. |
| 5,093,718 A | 3/1992 | Hoarty et al. |
| 5,111,196 A | 5/1992 | Hunt |
| 5,111,927 A | 5/1992 | Schulze, Jr. |
| 5,119,295 A | 6/1992 | Kapur |
| 5,128,520 A | 7/1992 | Rando et al. |
| 5,128,752 A | 7/1992 | VonKohorn |
| 5,155,591 A | 10/1992 | Wachob |
| 5,158,310 A | 10/1992 | Tannehill et al. |
| 5,159,549 A | 10/1992 | Hallman, Jr. et al. |
| 5,173,594 A | 12/1992 | McClure |
| 5,176,224 A | 1/1993 | Spector |
| 5,198,644 A | 3/1993 | Pfeiffer |
| 5,208,742 A | 5/1993 | Warn ............................ 700/2 |
| 5,214,792 A | 5/1993 | Alwadish |
| 5,227,874 A * | 7/1993 | Von Kohorn ................. 705/10 |
| 5,231,568 A | 7/1993 | Cohen et al. |
| 5,235,509 A | 8/1993 | Mueller et al. |
| 5,237,157 A | 8/1993 | Kaplan |
| 5,237,620 A | 8/1993 | Deaton |
| 5,239,480 A | 8/1993 | Huegel |

| Patent | Type | Date | Inventor | Class |
|---|---|---|---|---|
| 5,243,174 | A | 9/1993 | Veeneman et al. | |
| 5,250,789 | A | 10/1993 | Johnsen | |
| 5,253,345 | A | 10/1993 | Fernandes et al. | 705/17 |
| 5,256,863 | A | 10/1993 | Ferguson et al. | |
| 5,278,752 | A | 1/1994 | Narita et al. | |
| 5,285,278 | A | 2/1994 | Holman | |
| 5,287,266 | A | 2/1994 | Malec et al. | |
| 5,295,064 | A | 3/1994 | Malec et al. | |
| 5,297,026 | A | 3/1994 | Hoffman | 705/14 |
| 5,305,196 | A | 4/1994 | Deaton et al. | |
| 5,310,997 | A | 5/1994 | Roach et al. | |
| 5,319,455 | A | 6/1994 | Hoarty et al. | |
| 5,343,239 | A | 8/1994 | Lappington et al. | |
| 5,373,440 | A | 12/1994 | Cohen et al. | |
| 5,382,970 | A | 1/1995 | Kiefl | |
| 5,388,165 | A | 2/1995 | Deaton et al. | 382/139 |
| 5,389,964 | A | 2/1995 | Oberle et al. | |
| 5,401,946 | A | 3/1995 | Weinblatt | |
| 5,404,161 | A | 4/1995 | Douglass et al. | |
| 5,412,191 | A | 5/1995 | Baitz et al. | |
| 5,412,416 | A | 5/1995 | Nemirofsky | |
| 5,430,644 | A | 7/1995 | Deaton et al. | |
| 5,438,355 | A | 8/1995 | Palmer | |
| 5,448,471 | A | 9/1995 | Deaton et al. | |
| RE35,117 | E | 12/1995 | Rando et al. | |
| 5,483,049 | A | 1/1996 | Schulze, Jr. | |
| 5,488,423 | A | 1/1996 | Walkingshaw et al. | |
| 5,490,060 | A | 2/1996 | Malec et al. | |
| 5,491,838 | A | 2/1996 | Takahisa et al. | |
| 5,500,514 | A | 3/1996 | Veeneman et al. | |
| 5,504,519 | A | 4/1996 | Remillard | |
| 5,508,731 | A | 4/1996 | Kohorn | |
| 5,510,859 | A | 4/1996 | Douglass et al. | |
| 5,513,102 | A | 4/1996 | Auriemma | 705/14 |
| 5,513,109 | A | 4/1996 | Fujishima | |
| 5,515,270 | A | 5/1996 | Weinblatt | 705/14 |
| 5,523,794 | A | 6/1996 | Mankovitz et al. | |
| 5,528,490 | A | 6/1996 | Hill | |
| 5,535,118 | A | 7/1996 | Chumbly | |
| 5,537,314 | A | 7/1996 | Kanter | 705/14 |
| 5,546,523 | A | 8/1996 | Gatto | |
| 5,550,734 | A | 8/1996 | Tarter et al. | |
| 5,557,721 | A | 9/1996 | Fite et al. | |
| 4,210,961 | A | 10/1996 | Whitlow et al. | |
| 5,564,073 | A | 10/1996 | Takahisa | |
| 5,570,465 | A | 10/1996 | Tsakanikas | |
| 5,577,266 | A | 11/1996 | Takahisa et al. | |
| 5,579,537 | A | 11/1996 | Takahisa | |
| 5,584,025 | A | 12/1996 | Keithley et al. | |
| 5,592,378 | A | 1/1997 | Cameron et al. | |
| 5,592,560 | A | 1/1997 | Deaton et al. | |
| 5,594,493 | A | 1/1997 | Nemirofsky | |
| 5,604,542 | A | 2/1997 | Dedrick | |
| 5,612,527 | A | 3/1997 | Ovadia | |
| 5,612,730 | A | 3/1997 | Lewis | |
| 5,621,812 | A | 4/1997 | Deaton et al. | |
| 5,634,101 | A | 5/1997 | Blau | |
| 5,638,457 | A | 6/1997 | Deaton et al. | |
| 5,642,485 | A | 6/1997 | Deaton et al. | |
| 5,647,677 | A | 7/1997 | Smith | |
| 5,649,114 | A | 7/1997 | Deaton et al. | |
| 5,652,421 | A | 7/1997 | Veeneman et al. | |
| 5,659,469 | A | 8/1997 | Deaton et al. | |
| 5,664,110 | A | 9/1997 | Green et al. | |
| 5,675,662 | A | 10/1997 | Deaton et al. | |
| 5,679,938 | A | 10/1997 | Templeton et al. | |
| 5,687,322 | A | 11/1997 | Deaton et al. | |
| 5,697,844 | A | 12/1997 | Von Kohorn | |
| 5,701,252 | A | 12/1997 | Facchin et al. | |
| 5,710,886 | A | 1/1998 | Christensen et al. | |
| 5,715,399 | A * | 2/1998 | Bezos | 705/27 |
| 5,721,908 | A | 2/1998 | Lagarde et al. | 707/10 |
| 5,727,153 | A | 3/1998 | Powell | |
| 5,734,823 | A | 3/1998 | Saigh et al. | |
| 5,734,838 | A | 3/1998 | Robinson et al. | |
| 5,759,101 | A | 6/1998 | Von Kohorn | |
| 5,761,648 | A * | 6/1998 | Golden et al. | 705/14 |
| 5,774,170 | A | 6/1998 | Hite et al. | |
| 5,774,869 | A | 6/1998 | Toader | |
| 5,774,870 | A | 6/1998 | Storey | |
| 5,793,849 | A | 8/1998 | Young et al. | |
| 5,794,210 | A | 8/1998 | Goldhaber et al. | |
| 5,806,044 | A | 9/1998 | Powell | |
| 5,806,045 | A | 9/1998 | Biorge et al. | 705/14 |
| 5,812,668 | A | 9/1998 | Weber | |
| 5,815,657 | A | 9/1998 | Williams et al. | |
| 5,832,457 | A | 11/1998 | O'Brien et al. | |
| 5,832,458 | A | 11/1998 | Jones | |
| 5,839,117 | A | 11/1998 | Cameron et al. | |
| 5,845,259 | A | 12/1998 | West et al. | |
| 5,850,446 | A | 12/1998 | Berger et al. | |
| 5,855,007 | A | 12/1998 | Jovicic et al. | |
| 5,855,008 | A | 12/1998 | Goldhaber et al. | |
| 5,857,175 | A | 1/1999 | Day et al. | |
| 5,859,414 | A | 1/1999 | Grimes et al. | 235/383 |
| 5,864,825 | A | 1/1999 | Kobayashi et al. | 705/24 |
| RE36,116 | E | 2/1999 | McCarthy | |
| 5,870,723 | A | 2/1999 | Pare, Jr. et al. | 705/39 |
| 5,870,724 | A | 2/1999 | Lawlor et al. | |
| 5,889,863 | A | 3/1999 | Weber | |
| 5,903,874 | A | 5/1999 | Leonard et al. | |
| 5,905,246 | A | 5/1999 | Fajkowski | |
| 5,907,831 | A | 5/1999 | Lotvin et al. | |
| 5,909,673 | A | 6/1999 | Gregory | |
| 5,915,243 | A | 6/1999 | Smolen | |
| 5,916,024 | A | 6/1999 | Von Kohorn | |
| 5,918,014 | A | 6/1999 | Robinson | 709/219 |
| 5,918,211 | A | 6/1999 | Sloane | |
| 5,918,213 | A | 6/1999 | Bernard et al. | |
| 5,923,552 | A | 7/1999 | Brown et al. | 700/100 |
| 5,924,080 | A | 7/1999 | Johnson | |
| 5,931,917 | A | 8/1999 | Nguyen et al. | |
| 5,943,424 | A | 8/1999 | Berger et al. | |
| 5,948,040 | A | 9/1999 | DeLorme et al. | |
| 5,963,924 | A | 10/1999 | Williams et al. | |
| 5,970,472 | A | 10/1999 | Allsop et al. | 705/26 |
| 5,974,396 | A | 10/1999 | Anderson et al. | |
| 5,978,013 | A | 11/1999 | Jones et al. | |
| 5,978,840 | A | 11/1999 | Nguyen et al. | |
| 5,979,757 | A | 11/1999 | Tracy et al. | |
| 5,982,891 | A | 11/1999 | Ginter et al. | 705/54 |
| 5,982,892 | A | 11/1999 | Hicks et al. | 514/300 |
| 5,983,196 | A | 11/1999 | Wendkos | |
| 5,983,208 | A | 11/1999 | Haller et al. | |
| 5,987,132 | A | 11/1999 | Rowney | |
| 5,987,504 | A | 11/1999 | Toga | 709/206 |
| 5,992,888 | A | 11/1999 | North et al. | 283/56 |
| 5,995,015 | A | 11/1999 | DeTemple et al. | 340/825.49 |
| 5,995,942 | A | 11/1999 | Smith et al. | |
| 5,996,076 | A | 11/1999 | Rowney et al. | |
| 5,999,912 | A | 12/1999 | Wodarz et al. | 705/14 |
| 5,999,914 | A | 12/1999 | Blinn et al. | |
| 6,002,394 | A | 12/1999 | Schein et al. | |
| 6,002,767 | A | 12/1999 | Kramer | |
| 6,002,771 | A | 12/1999 | Nielsen | |
| 6,009,410 | A | 12/1999 | LeMole et al. | 705/14 |
| 6,012,039 | A | 1/2000 | Hoffman et al. | 705/14 |
| 6,026,369 | A | 2/2000 | Capek | 705/14 |
| 6,029,142 | A | 2/2000 | Hill | 705/27 |
| 6,047,263 | A | 4/2000 | Goodwin, III | 705/20 |
| 6,076,068 | A | 6/2000 | DeLapa et al. | 705/14 |
| 6,105,002 | A | 8/2000 | Powell | 705/14 |
| 6,237,145 | B1 | 5/2001 | Narasimhan et al. | 725/23 |
| 6,321,208 | B1 | 11/2001 | Barnett et al. | 705/14 |

| | | | |
|---|---|---|---|
| 6,336,099 B1 * | 1/2002 | Barnett et al. | 705/14 |

FOREIGN PATENT DOCUMENTS

| | | |
|---|---|---|
| EP | 0512509 A2 | 11/1992 |
| EP | 0822535 A2 | 2/1998 |
| GB | 1287304 | 8/1972 |
| GB | 1437883 | 6/1976 |
| GB | 2105075 | 5/1982 |
| JP | 7-306654 | 11/1995 |
| JP | 8-115361 | 5/1996 |
| JP | 9-231263 | 9/1997 |
| JP | 10-143563 | 5/1998 |
| JP | 10-187320 | 7/1998 |
| WO | WO 85/01373 | 3/1985 |
| WO | WO 93/15466 | 8/1993 |
| WO | WO 94/27231 | 11/1994 |
| WO | WO 95/16971 | 6/1995 |
| WO | WO 97/23838 | 7/1997 |
| WO | WO 97/31322 | 8/1997 |
| WO | WO 98/18093 | 4/1998 |

OTHER PUBLICATIONS

Response Reward Systems, *Sports and Trivia*.

Response Reward Systems, Internet Casino Ltd., Licensee under Response Reward patents covering Interactive Internet Games.

Response Reward Systems L.C., Game Show and Quiz Programs.

Response Reward Systems L.C., Vonkohorn Interactive Patents, Examples, Scenarios, Flowsheets and Claims selected from Patents covering Electronic Systems and Methods (reviewed as of Jan. 1, 1995).

Response Reward Systems, Interactive TV Technology, etc., Address by Henry Von Kohorn to the Brocasting Promotion and Marketing Executives Conference, Baltimore, Jun. 17, 1991.

Response Reward Systems, Interactive Television, Internet, Radio and Telephone Technologies. (as of Jun. 1999).

Response Reward Systems, Interactive Response Reward Technology for Television, Radio and Telephone.

Response Reward Systems, Response Reward Television.

Response Reward Systems, Highlights of Interactive Technologies of Response Reward Systems L.C. For purposes of illustration, a number of selected patents are listed as of Oct. 31, 1997.

Response Reward Systems L.C., Response Reward Interactive In-Home Couponing Systems & Methods.

Response Reward Systems, The Response Reward Technology.

Response Reward Systems, Interactive Results with One Way Communication in Entertainment Televised Home Shopping Market Research Education.

Response Reward Systems L.C., Summary of Patented Interactive Technologies in the fields of Marketing and Entertainment as of Jun. 30, 1996.

Various Articles Concerning "ZING" Technology.

Various Articles Concerning Interactive TV/Couponing.

Various Articles Concerning On-Line Gaming/Lotteries.

Various Articles Concerning Marketing/On-Line Coupons.

"Acu-Trac and Cox Launch Interactive Couponing Service," Electronic Marketplace Report, Mar. 21, 1995, vol. 9, No. 6, Information Access Company, (2 pages).

Elliott, Stuart. "A Last Hurdle for Shoppers: The Checkout-Counter Pitch," NY Times, Jan. 11, 1993, The New York Times Company, (2 pages).

* cited by examiner

SERVICE SOFTWARE ROUTINE

CONSUMER SOFTWARE ROUTINE

RESERVATION FLOW

CONSUMER SOFTWARE ROUTINE

CONSUMER SOFTWARE ROUTINE

PROCESS FOR THE DISTRIBUTION AND REDEMPTION OF COUPONS

This application is a continuation of U.S. Ser. No. 09/073,334, now abandoned filed May 6, 1998, which is a continuation of U.S. Ser. No. 08/507,693, filed Jul. 25, 1995, now U.S. Pat. No. 5,761,648.

BACKGROUND OF THE INVENTION

The present invention generally relates to the use of an interactive marketing network. More specifically, the present invention relates to the interactive use by service providers and consumers of electronic certificates over online networks.

Increasingly, consumers are gaining direct access to data bases for information and entertainment, whether through phone lines and coaxial cable or by wireless connections from cell systems and satellites. With this so-called "online" access, consumers can use data bases for a range of activities at virtually any time. Besides granting freedom to the consumer, online access gives added efficiencies to companies merchandising products and services, whether those products are sold directly to the consumer by mail or in a store.

At the same time, various types of transactions are currently consummated using certificates such as coupons, tickets, etc. These certificates typically contain data (referred to in the claims as "transaction data") describing the particular transaction (e.g., in the case of a coupon, the transaction data would include a product description, the coupon amount, and the expiration date). These certificates also typically contain data (referred to in the claims as "identification data") such as various numbers, letters, barcodes or other symbols sufficient to uniquely identify each certificate.

The need arises for creation of an online "electronic certificate" that can be used for promotional or transactional purposes, much as coupons have been used in such traditional marketing vehicles as newspapers and mail packs. Beyond offering a discount as an incentive to buy a feature product, the coupon is also currency, printed in quantities limited by the issuer and often carrying unique serial numbers, expiration dates and "source codes" which indicate the means by which it was distributed (e.g. newspaper, mail list, in-store dispenser, etc.), so issuers can track the effectiveness of each marketing medium.

Known coupon dispensing systems, for example, fail to interactively communicate between a service center and a third party, as pointed out in U.S. Pat. No. 5,303,197 to Axler. While the Axler patent permits an operator to periodically "visit" a dispensing machine, this does not allow "real time" interactivity (e.g., it does not permit the operator to access and analyze demographical data contemporaneous with its input). Nor does Axler (or any other known prior art systems) envision the creation of an online "electronic certificate," as will be described below.

A data processing system and method according to the present invention successfully emulates the attributes of a coupon over an online network (i.e., an "electronic coupon" is created). Moreover, given the direct access to consumers, the data processing system exceeds the capabilities of traditional coupons by providing issuers a greater degree of control in targeting the offer, restricting its use and tracking both the selection and redemption process. The data processing system's controls also make it possible for service providers, such as restaurants and hotels, to use an online electronic certificate as a promotional means and a way to lower overhead in providing such transactions as dining, travel and ticket reservations.

SUMMARY OF THE INVENTION

The present invention provides a data processing system and method permitting consumers to access a data base online and use electronic certificates. The data processing system identifies and marks each electronic certificate with a code distinguishing it from all other certificates and with another code identifying the user. In addition, the data processing system permits coupon issuers to go online as well to create the certificate and specify controls that restrict the total number of certificates issued as well as the number to be issued to each individual.

The data processing system also preferably issues reports as soon as the consumers choose a certificate from the data base and have it downloaded to their resident storage systems or "remote computer terminals." Reports can be generated that show whether the consumer had the certificate printed with the consumer's printer or had it sent, as a computer record, back to the service data base. All of these reports can assist the issuer in research, security, and confirmation of a purchase or reservation.

In a preferred embodiment, the data processing system of the present invention can issue electronic certificates created by an operator, and permits the storing and retrieval of data pertaining to the certificates entered by users of a communicating first set of remote computer terminals. This embodiment includes a service system including a first computer processor for processing data and a first computer storage system for storing data on a storage medium. Also included is an issuer system including a second computer processor for processing data and a second computer storage system for storing data on a storage medium. The issuer system permits the operator to provide the service system with instructions for issuing a predetermined type and number of the electronic certificates. The service system is in selective electrical communication with both the issuer system and each of the remote computer terminals. Preselected identification data stored within either the first or the second computer storage systems and useable by either the first or the second computer processors is used to provide the first computer processor with appropriate instructions for associating each of the issued electronic certificates with one or more identifying symbols. Users of the remote computer terminals are then permitted to controllably access the electronic certificates.

A process for providing an interactive marketing system capable of using electronic certificates that can be accessed online by remote computer terminals linked within a computer network also forms part of the present invention. In this embodiment, an online network is provided including an issuing site having a first computer processor and a first computer storage system, and a service site having a second computer processor and a second computer storage system. The issuing site and the service site are in electrical communication, and the service site and each of the remote computer terminals are also in electrical communication. Instructions for issuing a predetermined number of electronic certificates are transmitted from the issuing site to the service site, each of the certificates including transaction data. The service site, upon receiving these instructions, revises the electronic certificates by providing the issued electronic certificates with unique identification data. The revised electronic certificates can then be accessed by users of the remote computer terminals. Consumer data entered by the remote computer terminal users can be provided to the service site, and then selectively transmitted to the issuing site. Each of these steps can be selectively repeated, as required.

In a second preferred process embodiment of the present invention, a process for selectively storing, retrieving and transmitting reservation data is provided. First, a computer operating system is provided, including an issuing site with an issuing computer having an initial set of reservation instructions, and a service site with a service computer also having the initial set of reservation instructions. The issuing and service computers of the computer operating system are in electrical communication. Next, updated reservation data is transmitted from remote computer terminals electronically linked to the service computer. The updated reservation data is used by the service computer to revise the initial set of reservation instructions, resulting in a revised set of reservation instructions contained within the service computer. Now, data pertaining to the revised set of reservation instructions is transmitted from the service computer to the issuing computer. The data pertaining to the reservation instructions can be contained within the service computer in the form of an electronic reservation coupon, which can be printed by the remote computer terminal users. Again, these steps can be selectively repeated, as required.

In its broadest embodiment, the system of the present invention is used to create an electronic certificate. This system includes a computer system that can process and store data. The computer system is capable of creating a plurality of electronic certificates. Each of the electronic certificates contains transaction data and unique identification data, and can be accessed by remote users linked to the computer system.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE FIRST PREFERRED EMBODIMENT

Figure 1:
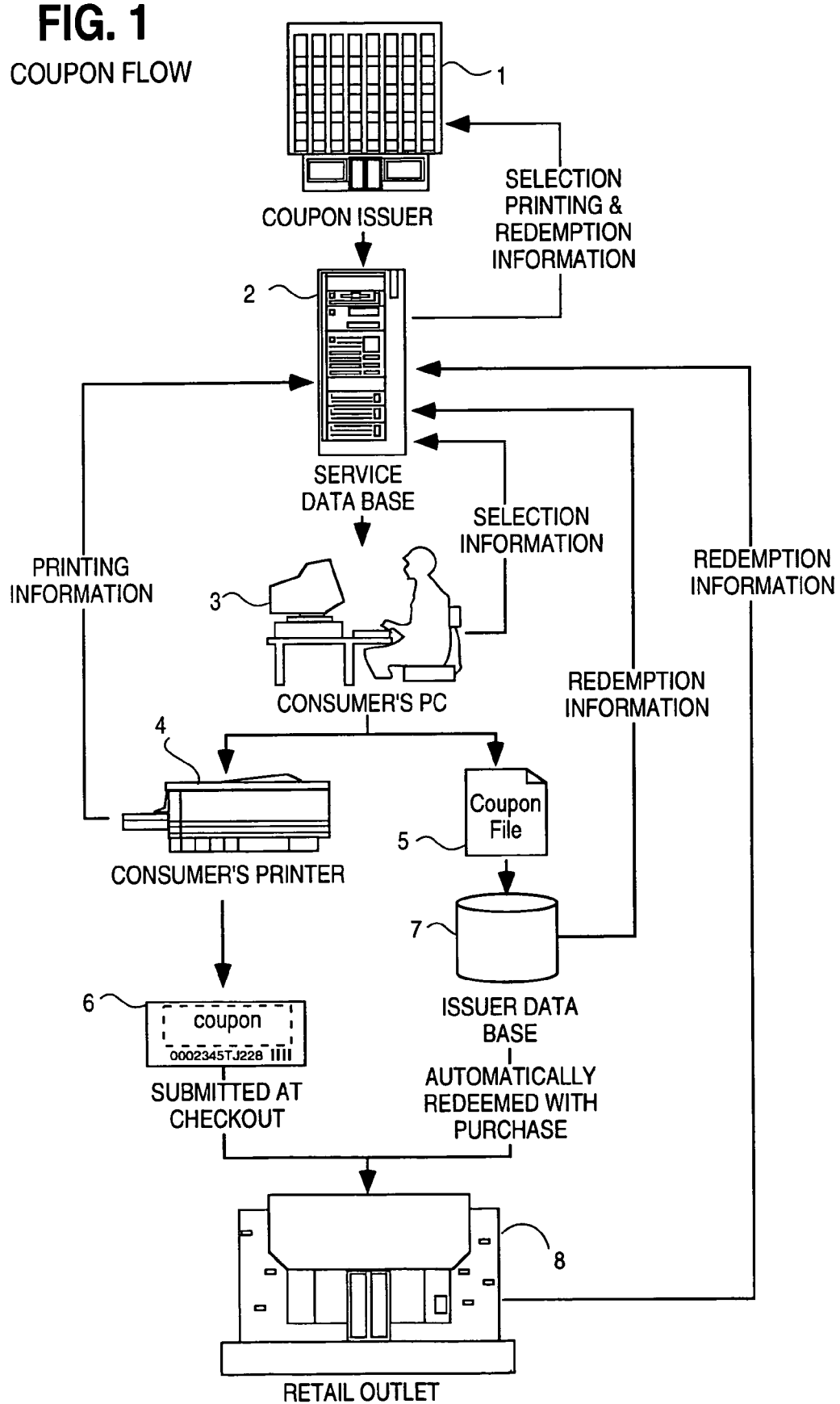
FIG. 1 depicts the flow of information in a system delivering online coupons to consumers.

The present invention is directed to a data processing system and method for use in dispensing and using electronic certificates such as coupons over online systems. FIG. 1 is an overview showing how the information and activities flow from creation of the electronic certificate to its selection and printing by the consumer, and its ultimate redemption. The process starts with the coupon issuer 1 who creates the coupon instructions (which will typically include the transaction data) and downloads them to the service data base 2 which receives the instructions and assigns the identification data and issue restrictions. The service data base 2 can then display the active coupon files to the consumer, and make the designated amount available for downloading to the consumer's personal computer (PC) 3 or other input device. The consumer's PC 3 may download no more electronic coupons than the number specified in the coupon issuer 1 instructions.

Anytime before a coupon file's expiration date, the consumer may use one of two methods to redeem it, as shown in FIG. 1. First, the electronic coupon can be printed with a printer attached to the consumer PC 3 or other input device. Since files relating to the electronic coupon remain in the storage device of the consumer's PC even after the consumer signs off with the service data base 2, the consumer can quickly disconnect from the online system, and print the coupon later, at his/her leisure. Printed on the coupon 6 would be the expiration date, a unique serial number (distinguishing that coupon from all others) and a barcode with the personal identification number (PIN) of the consumer. This identification data is preferably assigned by the service data base 2; the PIN number can be pre-assigned to individual consumers when they register for the system. That printed coupon can then be submitted during check-out from a participating retail outlet and the stated credit would be deducted from the consumer's bill.

With the second method of redeeming a coupon, the consumer PC 2 transmits the selected coupon file 5 to a data base 7 designated by the issuer, where it is stored with the same information as the printed coupon, including the transaction and identification data. The check-out system at the retail outlet 8 would then automatically activate the discount if the consumer presented a store credit card or a third-party credit card and purchased the designated product. Preferably, the electronic transfer of the coupon from the consumer PC to data base 7 can only be done on-line. (This permits the service data base 2 to accurately track the coupon's printing or presentation activity, as discussed below.)

Information can also be passed back up through the system, first to the service data base 2 and then on to the coupon issuer 1. Thus, information about the coupon files or other demographical information, for example ("consumer data") or "profile data" can be downloaded by the consumer PC 3 and the coupon files can be sent to the consumer's printer 4 or to an issuer data base 7. Redeemed printed coupons 6 could also have their barcodes scanned by the service to identify, for research purposes, the consumers who used the coupons. (For increased security, at check-out the barcode could be compared to ensure the consumer identity corresponds with the barcode.) Such information could also be transmitted from a coupon file 5 that is redeemed automatically.

Figure 2:
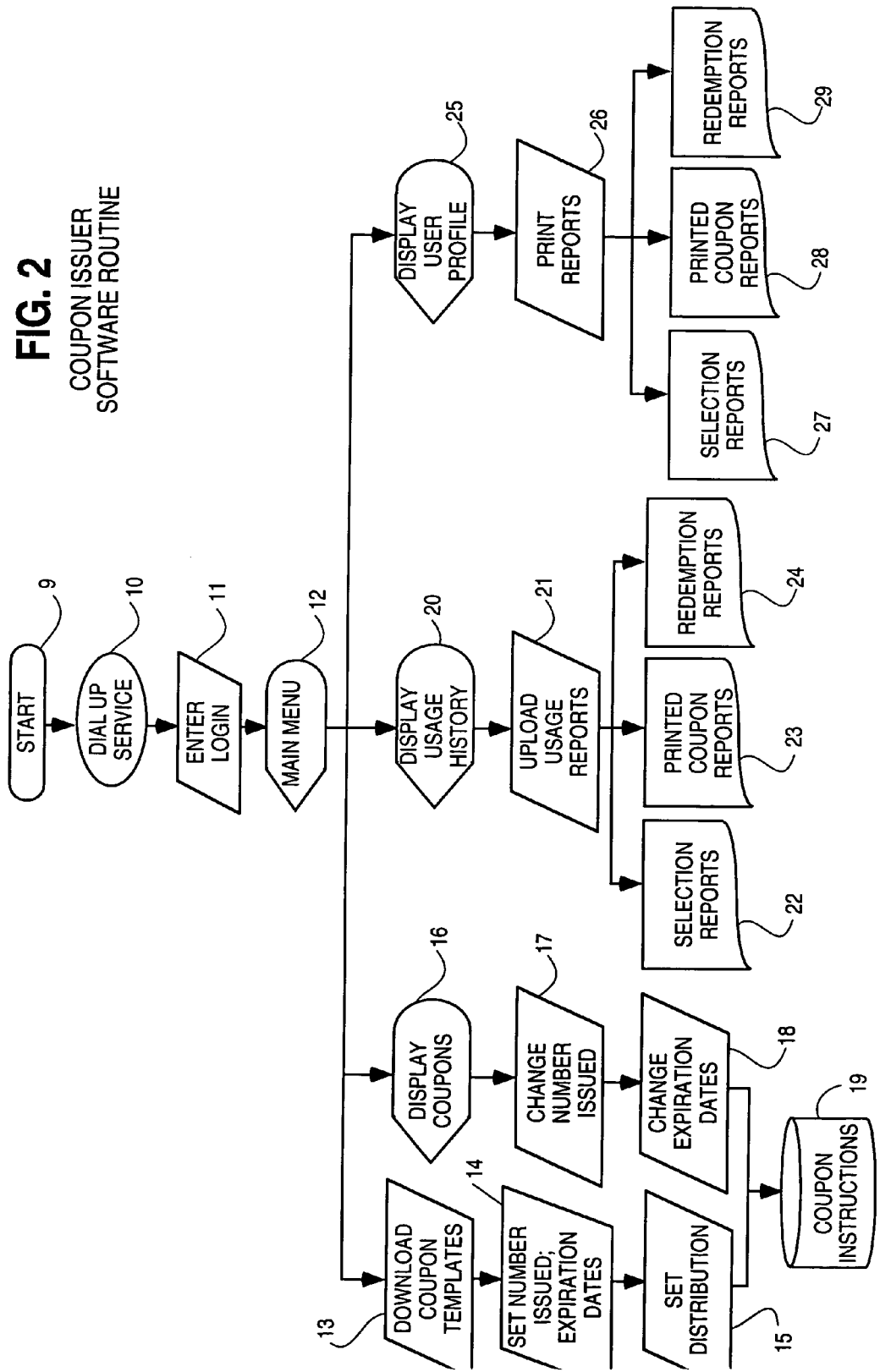
FIG. 2 is a flowchart of a software routine for a coupon issuer according to the present invention.

FIG. 2 depicts a software routine enabling the coupon issuer to download new coupon instructions, change old instructions, or upload information on coupon use. The routine begins 9 with dialing up the coupon service 10. To access the system, the issuer first enters a login password 11 (at which time the use of a pre-assigned registration number can be required). A main menu 12 is then displayed. Among the choices is creating new coupon instructions, which starts with a download of coupon templates 13 along with commands to set the number of coupons to be issued (both in total and to each individual consumer) and commands to set expiration dates 14. Commands can also be issued to limit coupon distribution by area or by a consumer's household profile 15. These coupon instructions are added to previously issued coupons. The issuer can review these electronic coupons 16 and then modify instructions as to (e.g.) numbers issued 17 or expiration dates 18. Previously issued coupons could also be deleted from the system should the issuer decide to do so. (They will be automatically deleted from the system following expiration.) These changes are used to update the coupon instructions 19 resident in the service data base.

Issuers can also access the system for usage history 20 to determine the remaining number of previously issued coupons. Further, the issuer can upload reports 21 based on the number of coupons selected 22, printed 23, and redeemed 24. Another function of the software is to analyze use based on the shopping habits and demographic characteristics of the user. This consumer data or profile data can be contained in the household profile, submitted by the consumer to register for the system and periodically updated with additional questions and usage history. An issuer can display information about those who have selected the issuers' coupons, generically referred to here as "correlation data" breaking down use by such factors as region and demographics 25. In addition, the issuer can upload user reports 26 based on selection 27, print commands 28, and redemption 29.

Figure 3:
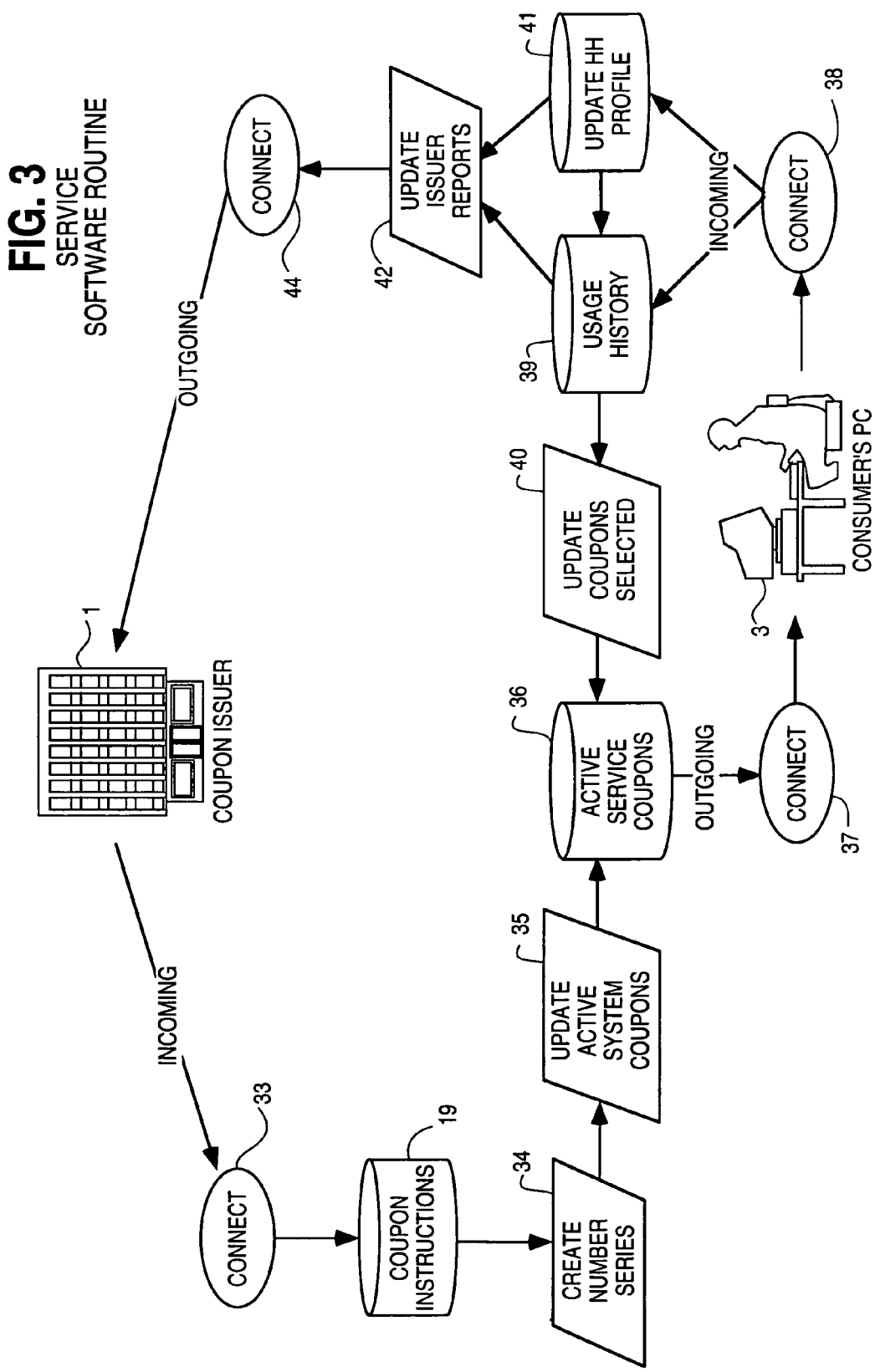
FIG. 3 is a flowchart of a software routine for the online coupon service provider according to the present invention.

The service data base, as shown in FIG. 3, is the bridge between the coupon issuer 1 and the consumer 3, and permits the flow of both incoming and outgoing information. First, over an online network 33, the service receives the coupon instructions 19 sent by the coupon issuer 1. The service software takes the instructions and assigns the requisite serial numbers 34 and issue restrictions. These new or changed coupons are then sent to update 35 the active service coupons 36 already in disk storage for that issuer. These active service coupons are part of the outgoing information sent to the consumer over the online network 37. Consumer usage information goes back the other way through the network 38. The service system takes usage information 39 on selection and updates the number of active services coupons remaining. Also incoming from the consumer is household profile information 41. The service takes this information and updates user reports 42 which are sent back through the network 44 to the issuer, completing the information circuit.

Figure 4:
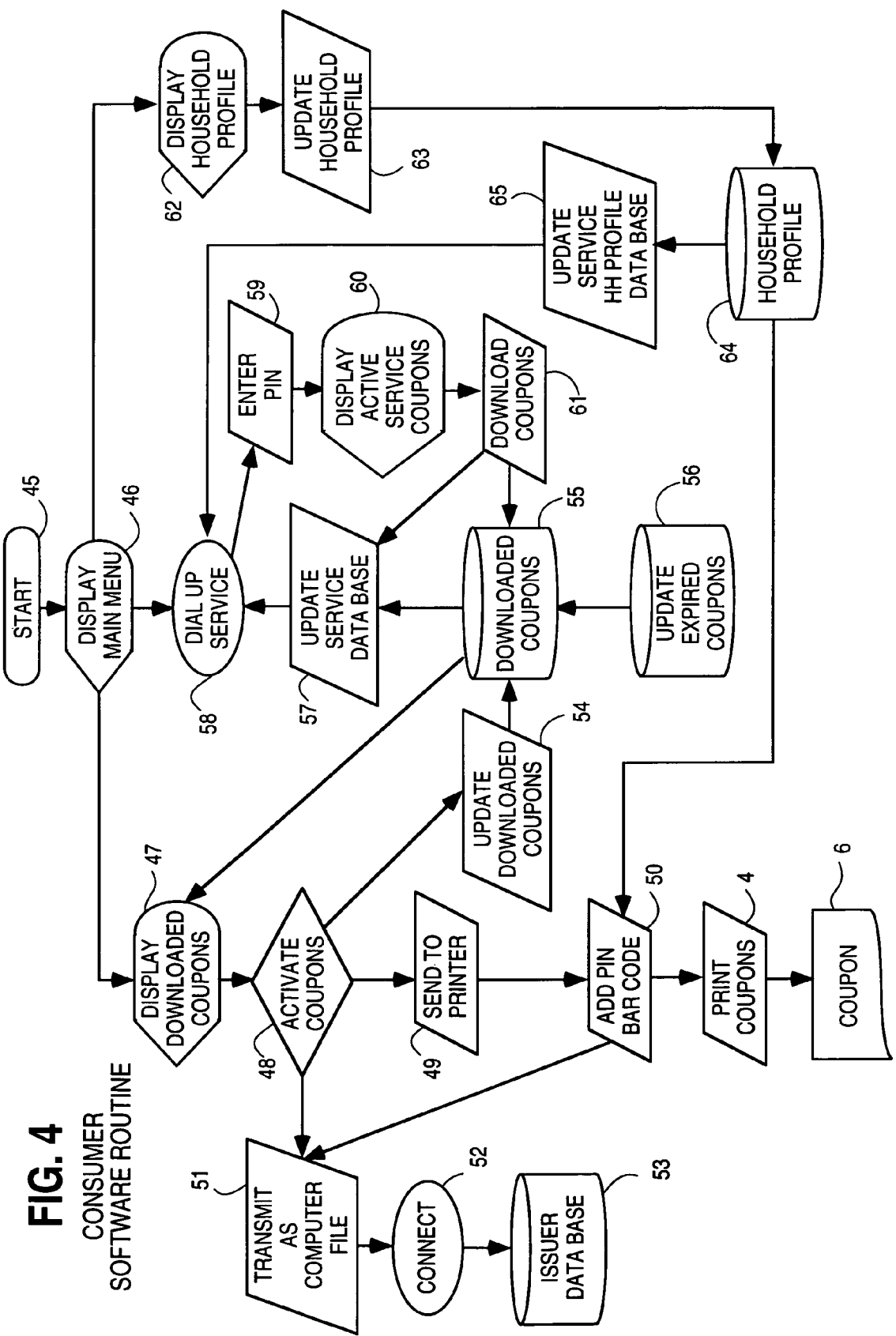
FIG. 4 is a flowchart of a software routine for the consumer using the coupon service according to the present invention.

FIG. 4 displays the software routine for the consumer. It starts 45 with a display of the main menu 46. The consumer may display the coupons that have already been downloaded and are resident on the consumer's PC 55. There are two methods by which the consumer could activate the coupons 48. The first would be to send the coupon file 49 to the consumer's printer. Along the way, it is barcoded with the consumer's PIN 50, which is accessed from the household profile data base 64. The consumer's printer 4 then prints out the coupon 6. Upon activation 48, a coupon could also be transmitted as a computer file 51, back through the network 52, to a data base chosen by the issuer. When coupons are activated 48, the consumer's resident software removes the coupon file that has been printed 54, updating the data base of downloaded electronic coupons 55 and the resident coupon display 47. The system also automatically removes expired coupon files that have yet to be activated 56. Another function of the resident software is displaying 62 and updating 63 the household profile 64 with information entered by the consumer in response to questions submitted by the service.

To access a new selection of coupons, the consumer can dial up the service data base 58, enter the PIN number 59, and view a display of all active service coupons 60. These coupons can then be selected and downloaded 61 to the consumer's PC. While online, the consumer's software automatically sends back to the service data base information on the consumer's selection and printing history 57, as well as information on those downloaded coupon files that have expired 56. It also sends back updated information on the consumer's household profile 65.

DETAILED DESCRIPTION OF THE SECOND PREFERRED EMBODIMENT

Figure 5:
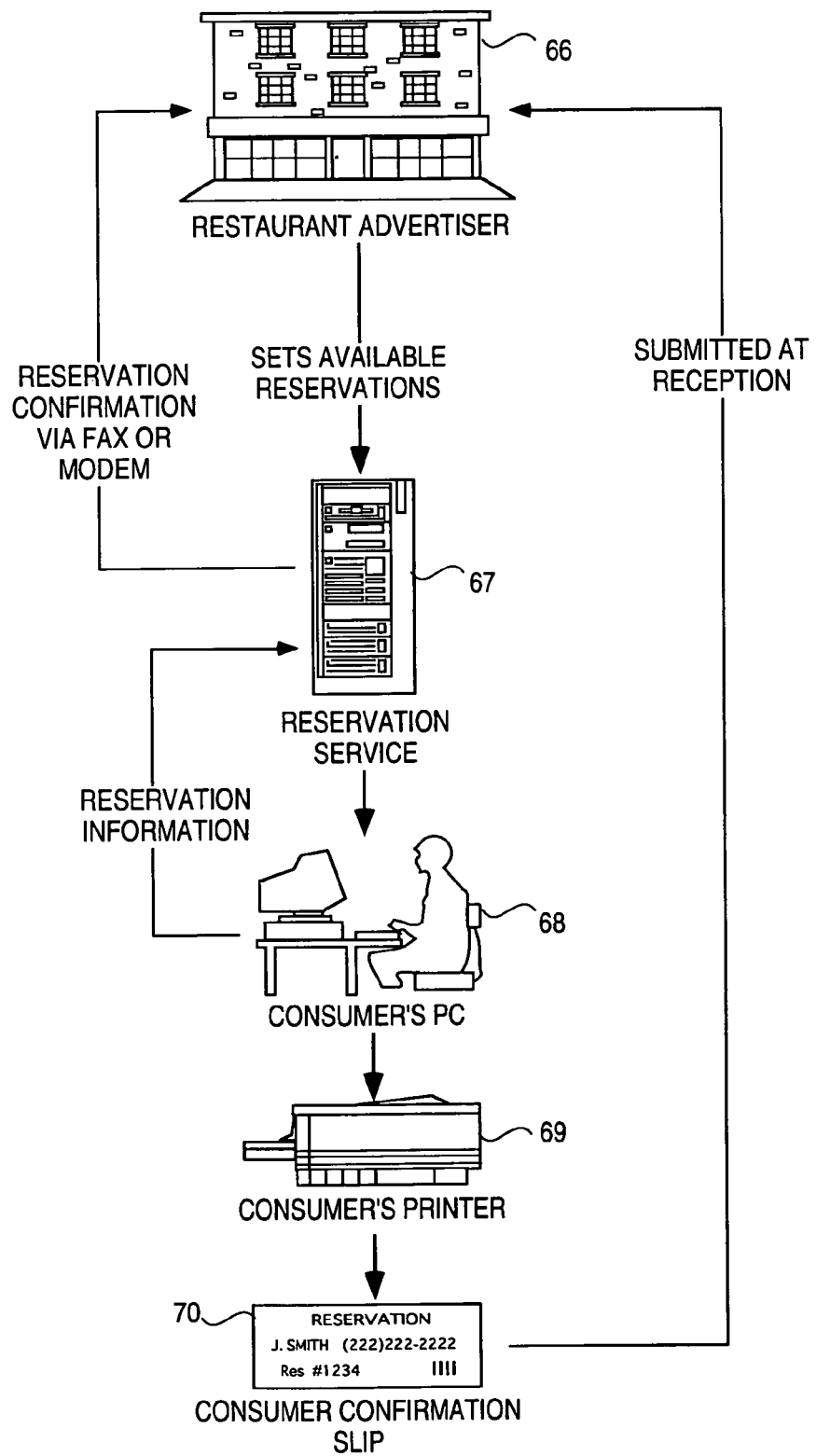
FIG. 5 depicts the flow of information in a system providing for restaurant reservations.

A second embodiment of the present invention is directed to a data processing system and method for use in automating reservations over online systems for restaurants, hotels, or other service establishments. FIG. 5 is an overview showing how the information and activities flow from the initial assignment of the reservation by the restaurant, to its selection by the consumer and the ultimate printing of a confirmation slip by the consumer's printer.

The automated reservation process starts with the host computer of the restaurant 66 which sets the number, time, and type of reservations available, and downloads those instructions to the reservation service 67, which receives the instructions and assigns the requisite confirmation numbers and issue restrictions. The reservation service 67 can then display the service's reservations to the consumer, and make them available for access through the consumer's personal computer (PC) 68 or other input device. Once the consumer chooses the restaurant, time and type of reservation (i.e. for two, for four, etc.), the data processing system immediately notifies the restaurant with a description of the reservation, the name and phone number of the consumer and the confirmation number. This information can be sent through the online computer network and also preferably by a designated fax machine (which may be more convenient for the restaurant's front-office staff than a computer). The consumer can then use a printer 69 attached to the consumer PC 68, or another input device, to print a confirmation slip 70. The confirmation slip can have a description of the reservation, the name and phone number of the consumer and the confirmation number. This slip would be presented to reception personnel upon the consumer's arrival at the restaurant and corroborated with the information that had previously been sent to the restaurant through the system and fax machine.

Feeding back up through the system, first to the service data base 67, and then on to the restaurant 66, is information about the reservations made by the consumer PC 68 and the profile the consumer has submitted as part of the registration process for the service ("consumer data"). This profile is continually updated by the consumer, in response to additional questions, and is also continually updated by the system, in tracking the reservations the consumer has made.

Figure 6:
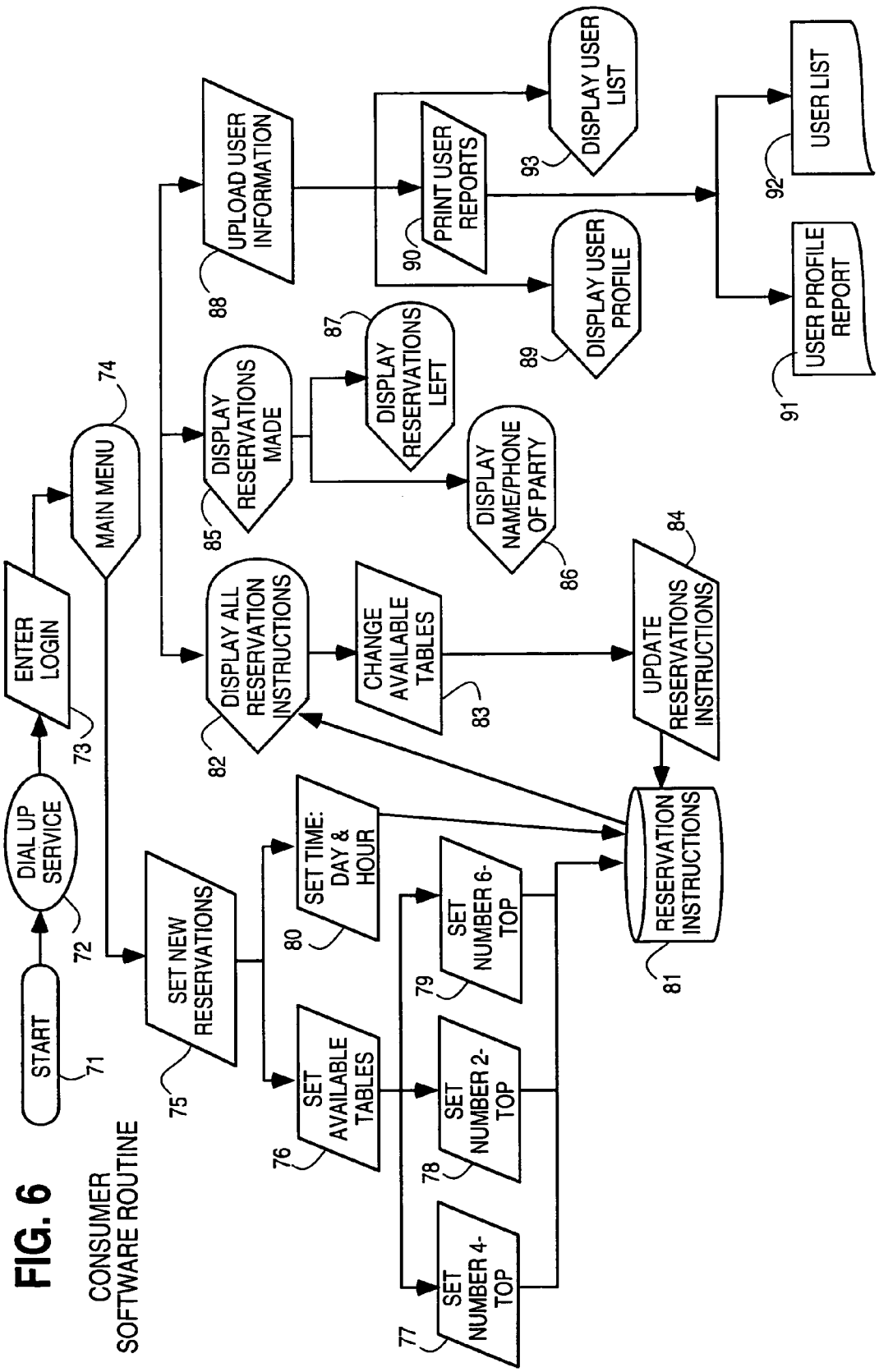
FIG. 6 is a flowchart of a software routine for a restaurant according to the present invention.

FIG. 6 depicts a software routine for the restaurant to set aside reservations for the system, change old reservations, and upload information on reservation use. The routine begins 71 with dialing up the reservation service 72. To access the system, the restaurant first enters a login password 73. A main menu 74 is then displayed. Among the choices is setting new reservations 75. The type of reservation and number of reservations is determined by setting available tables 76 (e.g., the number of tables available for seating two 78, four 77, and six 79). Instructions also include setting the day and time for the reservations 80. These reservation instructions can be added to previously issued, initial reservation instructions in disk storage 81.

Still referring to FIG. 6, the software can also be used to change previously issued reservations. The restaurant can review these electronic reservation "coupons" 82 and then modify instructions on (e.g.) the numbers of tables available 83. In this operation previously issued reservations could be deleted from the system at the restaurant's option. The updated reservation instructions 81 are then sent to the service data base. The system can also be accessed by restaurants for usage history 85 to view the names and phone numbers of those who have made reservations 86, and to determine the number of remaining reservations for a given hour 87. The restaurant can also upload information 88 on those who have used the service to book reservations at a particular location.

A user profile could be displayed 89 and a list of users could be displayed 93, or the restaurant could print user reports 90, and create a hard copy of the user profile 91 or user list 92.

The reservation service, as shown in FIG. 7, is again the bridge between the restaurant 66 and the consumer 68, and handles both incoming and outgoing information. First, over an online network 94, the service receives the reservation instructions 95 sent by the restaurant 66. The service software takes the instructions and assigns the requisite confirmation numbers to each reservation 96. These new or changed reservations are then sent to update 97 the active service reservations 98 already in disk storage for the restaurant. These active service reservations are part of the outgoing information sent to the consumer 68 over the online network 99.

Figure 7:
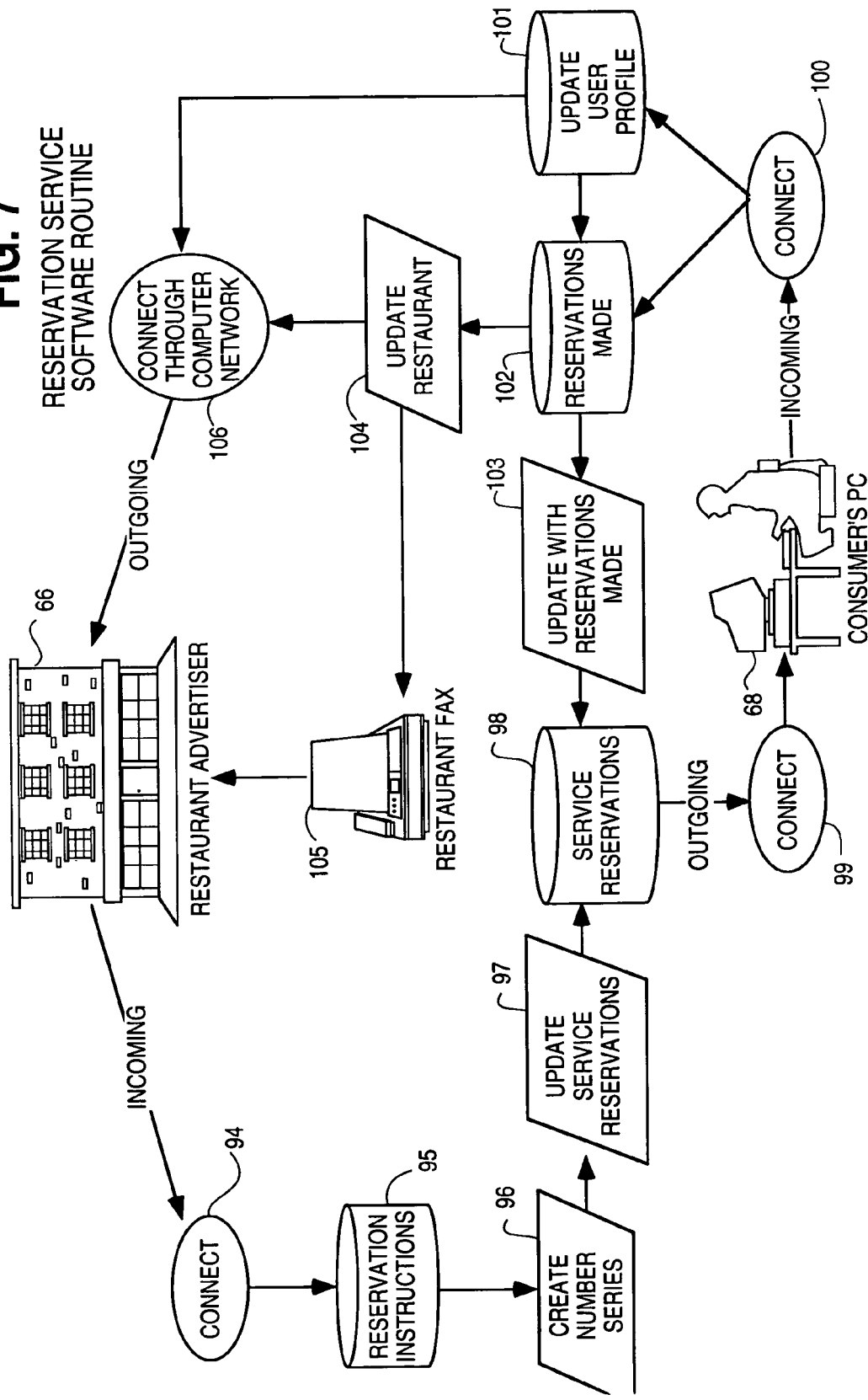
FIG. 7 is a flowchart of a software routine for the reservation service provider according to the present invention.

Still referring to FIG. 7, consumer usage information also moves from the consumer's PC back to the restaurant through the network 100. The service system takes the reservation made by the consumer 102 and updates the number of active service reservations remaining 103. This information is also used to update the restaurant 104 through a transmission to the restaurant fax machine 105 and through the computer network 106. Also incoming from the consumer is user profile information 101 which is sent back to the restaurant through the computer network 106.

Figure 8:
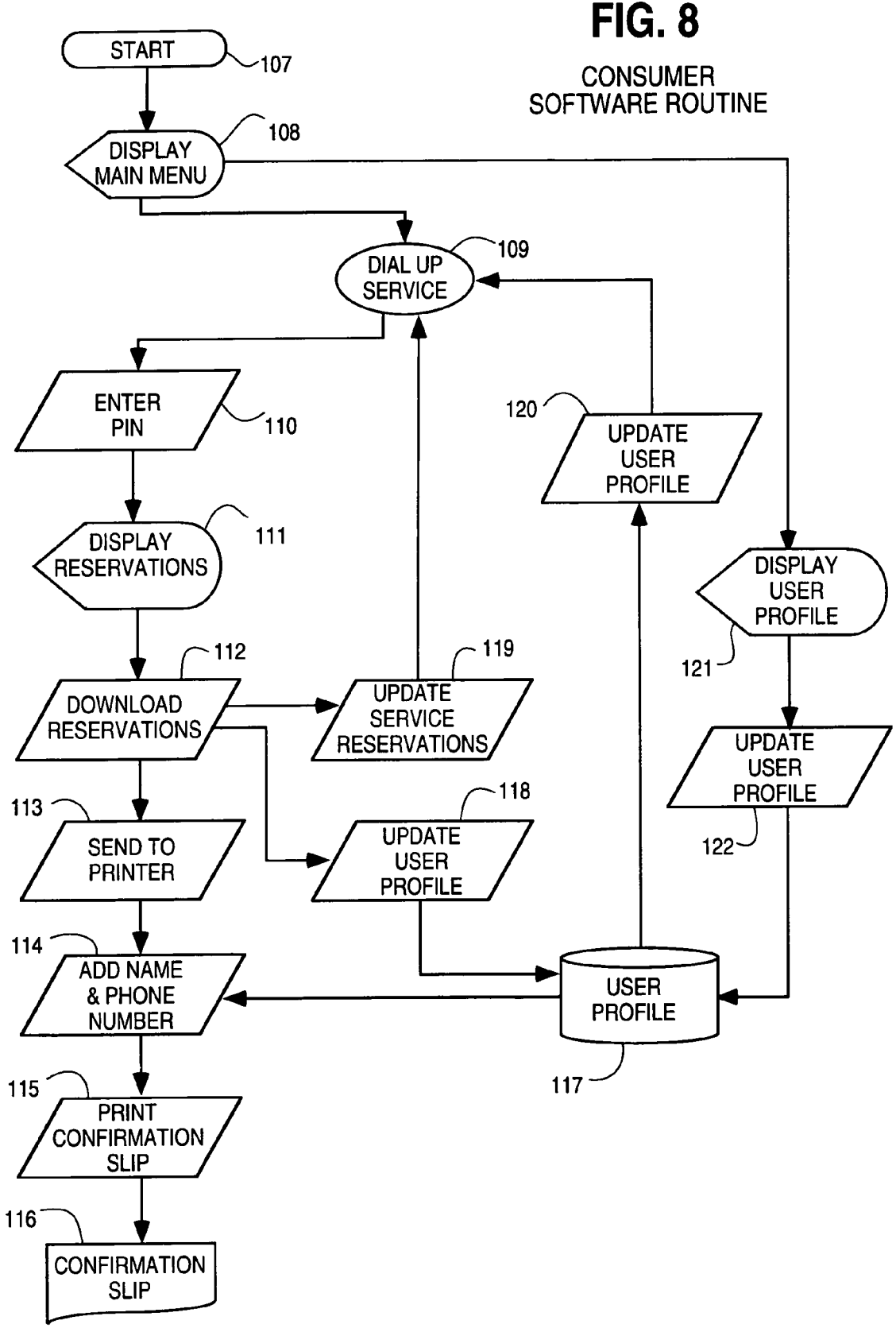
FIG. 8 is a flowchart of a software routine for the consumer using the reservation service according to the present invention.

FIG. 8 displays the software routine for the consumer. It starts 107 with a display of the main menu 108. The consumer can dial up the service data base 109, enter the PIN number 110, and view a display of all active service reservations 111. A reservation can then be selected and downloaded 112 to the consumer's PC, where it is sent to the printer 113. Along the way, the name and phone number of the consumer is taken from the user profile information storage 117 and added 114 to print instructions for the confirmation slip 116. A printer attached to the consumer PC can be used to print 115 the confirmation slip 116.

While online, the consumer's software sends back to the service information on the consumer's reservation 119 to update the remaining service reservations. The reservation also updates the consumer's user profile 117. The updated user profile information is also automatically sent back to the service while the consumer is online 120. The consumer can display the user profile 121 and update the profile 122 with answers to questions prompted to the consumer both during and after the registration process.

It can be appreciated that the present invention can be designed for use with various online software, including American Online®, Prodigy® and Microsoft®.

As will now be understood, the present invention provides an interactive electronic system employing electronic certificates, such as electronic coupons, in which access may be conditioned upon registration (i.e., the entry of specific consumer data such as household profile information). The registration information may then be provided to the service and issuer systems, and may be used to target further offers to specific classes of consumers meeting certain criteria (e.g., demographics). Further, since the interactive electronic system of the present invention also maintains consumer data on past users (e.g., specific households), the electronic certificates may be tailored based upon the consumer data responses.

As will now be apparent, the service system of the present invention can automatically review, store and provide to the issuer systems preselected consumer data entered by the remote user stations, as well as data pertaining to the use, issuance or revisions to the electronic certificates ("usage data"). The service system can condition the issuance of electronic certificates upon the entry of consumer data requested of the remote users by the service system. This consumer and/or usage data can be provided on a selective basis to issuer systems after it has been organized by the service system.

It will also be appreciated by those skilled in the art that various changes and modifications can be made to the illustrated embodiments without departing from the spirit of the present invention. For example, while the preferred embodiments describe particular types of electronic certificates (coupons and reservation slips), various other types of electronic certificates can be used by systems designed according to the present invention, including certificates used as proof of a gift, award or payment, and virtually any other types of certificates or vouchers. As another example, while the service data base 2 will typically assign identification data to the electronic certificate, this data could be transmitted and assigned together with the transaction data by the coupon issuer 1, or even by a third remote site. Also, rather than utilizing separate issuer and service computers, they could be consolidated into a single computer for particular applications. Further, use could be made of multiple issuer computers, multiple service computers, or combinations of the same, given a particular application. Still further, while the preferred embodiments have described users with "remote computer terminals" that consist of personal computers, users might access the marketing network of the present invention through various other accessing media, such as phone lines, televisions, or individual access stations dedicated for the use and dispensing of various certificates (much like cash machines are used today). These other accessing media would include appropriate software and hardware permitting interactive capabilities with remote computers, similar to that described in the preferred embodiments utilizing the personal computers. These and other modifications and changes within the spirit and scope of the present invention are intended to be covered by the appended claims.

We claim:

1. A process for distributing and redeeming coupons, comprising the steps of:

establishing electrical communication over the internet between a service system and a plurality of remote users having personal computers;

receiving at the service system from a plurality of issuer systems instructions for issuing the redeemable coupons;

receiving at the service system profile data input by the remote users over the internet;

the service system permitting remote user access to offers for redeemable coupons upon the entry of profile data requested of the remote users by the service system;

said offers being accessible over the Internet to selective remote users based on analysis of the profile data;

storing coupon files in a data base, said coupon files containing information relating to redeemable coupons offered to and selected by the remote users; and automatically redeeming coupons contained in said stored data base when the remote users make transactions using a credit card.

2. The process for distributing and redeeming coupons as set forth in claim 1 wherein said coupon file is transmitted to said data base using the Internet.

3. The process for distributing and redeeming coupons as set forth in claim 1 wherein said coupon file is transmitted to said database via the service system using the Internet.

* * * * *